United States Patent
Li et al.

(10) Patent No.: US 8,396,157 B2
(45) Date of Patent: Mar. 12, 2013

(54) PROBABILITY BASED MIMO MODE SELECTION AND SWITCHING SYSTEM AND METHOD FOR WIRELESS SYSTEMS

(75) Inventors: Dongdong Li, Frisco, TX (US); Dandan Wang, Berkeley Heights, NJ (US); Mazin Al-Shalash, Frisco, TX (US)

(73) Assignee: FutureWei Technologies, Inc., Plano, TX (US)

( * ) Notice: Subject to any disclaimer, the term of this patent is extended or adjusted under 35 U.S.C. 154(b) by 230 days.

(21) Appl. No.: 12/780,162

(22) Filed: May 14, 2010

(65) Prior Publication Data

US 2010/0290553 A1    Nov. 18, 2010

Related U.S. Application Data

(60) Provisional application No. 61/178,320, filed on May 14, 2009.

(51) Int. Cl.
*H04B 7/02* (2006.01)
(52) U.S. Cl. .......................................... 375/267; 375/220
(58) Field of Classification Search .................. 375/267, 375/219–220
See application file for complete search history.

(56) References Cited

U.S. PATENT DOCUMENTS

| 2008/0132281 A1* | 6/2008 | Kim et al. ...................... 375/349 |
| 2009/0034639 A1* | 2/2009 | Hwang et al. .................. 375/260 |

FOREIGN PATENT DOCUMENTS

| WO | WO 2008/041894 A1 | 4/2008 |
| WO | WO 2008/081453 A1 | 7/2008 |
| WO | WO 2008081453 A1 * | 7/2008 |

OTHER PUBLICATIONS

Khaled, N., et al., "Spatial-Mode Selection for the Joint Transmit and Receive MMSE Design," EURASIP Journal on Applied Signal Processing, 2004, pp. 1199-1211, vol. 2004, Issue 9, Hindawi Publishing Corporation.

"$3^{rd}$ Generation Partnership Project; Technical Specification Group Radio Access Network; Evolved Universal Terrestrial Radio Access (E-UTRA); Multiplexing and channel coding (Release 8)," Technical Specification, Sep. 2008, 56 pages, 3GPP TS 36.212 V8.4.0.

"$3^{rd}$ Generation Partnership Project; Technical Specification Group Radio Access Network; Evolved Universal Terrestrial Radio Access (E-UTRA); Physical layer procedures (Release 8)," Technical Specification, Sep. 2008, 60 pages, 3GPP TS 36.213 V8.4.0.

"$3^{rd}$ Generation Partnership Project, Technical Specification Group Radio Access Network; Evolved Universal Terrestrial Radio Access (E-UTRA); Physical Channels and Modulation (Release 8)," Technical Specification, Sep. 2008, 78 pages, 3GPP TS 36.211 V8.4.0.

* cited by examiner

*Primary Examiner* — Sam K Ahn
*Assistant Examiner* — Janice Tieu
(74) *Attorney, Agent, or Firm* — Slater & Matsil, L.L.P.

(57) ABSTRACT

In an embodiment, a method for determining a MIMO mode for a wireless communication system includes providing input parameters, an electronic device determining a probability of each MIMO mode being a dominant MIMO mode; and selecting the MIMO mode based on the determining.

20 Claims, 4 Drawing Sheets

PROBABILITY BASED MIMO MODE SELECTION AND SWITCHING SYSTEM AND METHOD FOR WIRELESS SYSTEMS

CROSS REFERENCE TO RELATED APPLICATIONS

This patent application claims priority to U.S. Provisional Application No. 61/178,320 filed on May 14, 2009, entitled "A Probability Based MIMO Mode Selection and Switching System and Method for Wireless Systems," which application is incorporated by reference herein in its entirety.

TECHNICAL FIELD

The present invention relates generally to communication systems, and more particularly to a system and method for a probability based MIMO mode selection and method for wireless systems.

BACKGROUND

A cellular mobile communication system generally has a plurality of base stations (eNB) dispersed across a geographic service area to provide services to multiple user equipment (UE). To provide high data rates, smart antenna technology, named as multiple-input-multiple-output (MIMO), has been adopted in many wireless systems, such as IEEE 802.11n, Worldwide Interoperability for Microwave Access (WiMAX) and Long Term Evolution (LTE). In these MIMO systems, eNBs and UEs are equipped with multiple transmit/receive antennas and utilize spatial diversity or multiplexing gains to maximize system capacity.

Practical implementation of a MIMO system is a complex process since it is difficult to choose a MIMO mode best suited for a specific transmitter and receiver, given various environments and time-varying channels. Additionally, an initially determined MIMO mode may no longer be optimal when certain environmental variables change, such as the speed of the UEs, the SNR of the UEs, and other variables.

SUMMARY OF THE INVENTION

Embodiments of the present invention relate generally to wireless communication systems and more specifically to a cellular wireless mobile communication system, where the base stations and the mobile stations are equipped with multiple transmit/receive antennas and where base stations configure transmission modes for users.

In an embodiment, a method for determining a MIMO mode for a wireless communication system includes providing input parameters, an electronic device determining a probability of each MIMO mode being a dominant MIMO mode; and selecting the MIMO mode based on the determining.

In a further embodiment, a method of determining a MIMO mode for a wireless communication system includes sorting a probability of available MIMO modes, an electronic device determining a relative ratio between a highest probability mode and a second highest probability mode based on the sorting, and if the relative ratio is greater than a threshold, selecting the highest probability mode as the best mode.

In a further embodiment, a system for determining a MIMO mode for a wireless communication system includes a dominant probability calculation block and a MIMO mode selection block coupled to the dominant probability calculation block. The dominant probability calculation block is configured to calculate dominant MIMO mode probabilities for a user device, for a plurality of MIMO modes, and the MIMO mode selection block is configured to select among these MIMO modes, based on the dominant probabilities. The MIMO mode selection block selects the MIMO mode corresponding to the highest probability if a ratio between the mode with the highest probability and the mode with next highest probability, or the probability of the currently configured mode, is greater than a threshold.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed exemplary embodiments provide a method of selecting/switching to the best MIMO mode. The method is not limited to these systems only and may apply to other protocols as well. As described below, one aspect of embodiment probability-based models of dominant probability of different MIMO modes and the procedure of MIMO mode selection and switching given the probability mode combined enable the eNB to configure the best MIMO mode to UE and avoid ping-pong effects.

Figure 1:
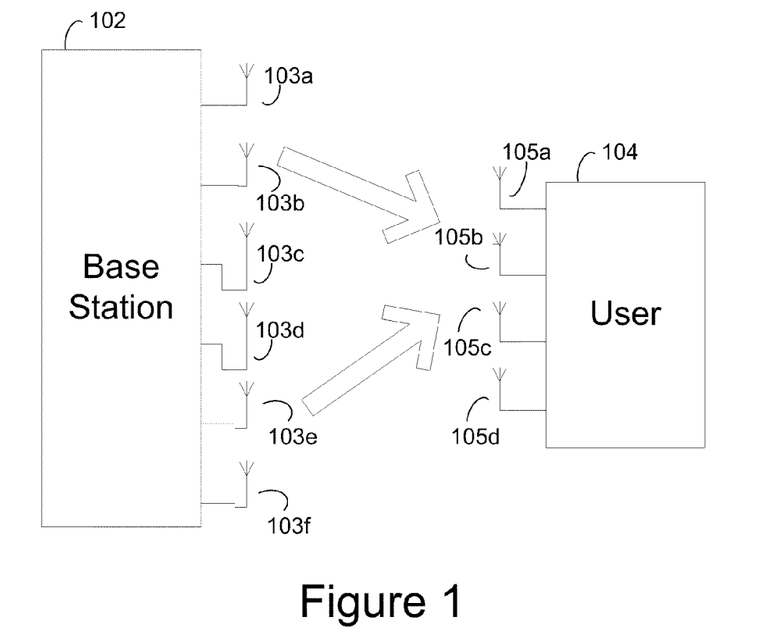
FIG. 1 illustrates an embodiment MIMO communication system.

As exemplary embodiment of an embodiment MIMO system is illustrated in FIG. 1. The MIMO system has base station 102 and wireless user device 104. Base station 102 has a plurality of antennas 103a, 103b, 103c, 103d, 103e and 103f, and user device 104 has a plurality of antennas 105a, 105b, 105c, and 105d. In some embodiments, base station 102 and/or user device 104 can have greater or fewer antennas than those depicted in FIG. 1. In an embodiment, base station 102 is an eNB and user 104 user equipment (UE) in an LTE system. In alternative embodiments, base station 102 can be a cellular base station, a base station in a broad band network, or other wireless base station. User device 104 can be a wireless terminal, laptop computer, cellular phone, smart phone, or other device configured to operate on a wireless network.

In an embodiment, for the same set of antenna configurations, there are different possible MIMO transmission modes. For example, in one embodiments, there are four MIMO modes:

A first mode is a transmit diversity (Spatial diversity) mode. In transmit diversity mode, original signals are transmitted over several different propagation paths using multiple transmitter antennas. Different from frequency diversity and temporal diversity, no additional bandwidth or transmission time is typically used to achieve transmit diversity except that the signals are pre-processed or pre-coded prior to transmission. Space-time codes are used to maximize link performance across space and time to achieve the transmit diversity, such as Alamouti space time codes.

In an embodiment, the performance of an equivalent channel using transmit diversity improves with respect to a single input single output (SISO) case, and, therefore, is able to use a higher modulation/coding rate to increase throughput. In some embodiments, a transmit diversity system does not have the receiver feedback information regarding the channel direction and/or the receiver has few, if any, constraints on the receive antennas.

A second mode is an open-loop spatial multiplexing (SM) mode. Spatial multiplexing (SM) transmits independent data flows/streams via different transmit antennas. In contrast to transmit diversity schemes, multiple independent data are transmitted over multiple channels. One SM technique is a Vertical-Bell Laboratories-Layered-Space-Time (V-BLAST) system. In an embodiment, open-loop spatial multiplexing uses antenna permutation to transmit more than one independent data stream and to achieve some diversity gain such as the large delay cyclic delay diversity (CDD) scheme in LTE. In an embodiment, open-loop spatial multiplexing does not require the feedback of the channel directions from the receiver, and can support more than one independent data stream at the same time.

A third mode is a Closed-loop Spatial Multiplexing mode. In Closed-Loop (CL) SM, the receivers feedback a quantized version of the channel's matrix. The transmitter then performs precoding based on the channel direction information fed back from the receiver. This information allows the transmitter to transmit the signals in a way that, ideally, is best for the receiver in the sense of throughput. In some CL SM systems, however, feedback information from the UE may become outdated if the UEs move fast. Furthermore, an incorrect precoding matrix may significantly reduce the throughput.

A fourth mode is Closed-loop Rank-1 Precoding, which can be considered as a special case of Closed-loop Spatial Multiplexing CL SM. In Closed-loop (CL) Rank-1 precoding, regardless how many multiple streams that the channel can simultaneously support, the eNB only supports one stream and uses a one column precoding matrix to transmit the signals to the UE. In an embodiment, as a special case of CL SM, CL Rank-1 precoding achieves a larger diversity gain even if the channel can support multiple streams. In some embodiments, CL Rank-1 precoding supports a multiple user MIMO scheduler. Also, CL Rank-1 precoding is useful when the eNB can use a highly correlated antenna to achieve precoding gain when supporting high speed UEs. In an LTE system, if the UE is configured by the eNB in a CL Rank-1 precoding mode, the UE does not need to feedback the rank information, thereby saving feedback overhead.

In some systems that use CL Rank-1 precoding, such as a LTE system, the UE does not feedback rank information. Therefore, in some situations, when the channel changes enough to be able to support more than one stream, the eNB does not know that information and loses the opportunity to increase the capacity.

In different embodiments, various wireless systems may support specific predefined MIMO modes. For example, in LTE systems, MIMO mode selection has 7 modes: 1) Single-antenna port; port 0 2) transmit diversity 3) Open-loop spatial multiplexing 4) Closed-loop spatial multiplexing 5) Multi-user MIMO 6) Closed-loop Rank=1 precoding 7) Single-antenna port; port 5. LTE systems differentiate rank=1 CL SM (mode 6) from the CL SM with other ranks (mode 4). Mode 3 (Open-loop spatial multiplexing) is implemented using precoding for large delay cyclic delay diversity, named OLCDD in the later. The UE is semi-statically configured by the eNB as one of the seven MIMO modes. Since configuration is a relatively large time scale operation, MIMO mode is not switched based on the instantaneous changes, in some embodiments. In some embodiments, the eNB selects the best MIMO mode based on its criteria and then notifies the UE about its decision. When an environmental variable changes, such as speed, SNR, etc, the eNB may switch the current MIMO mode to another MIMO mode. The method below illustrates how the eNB selects a MIMO mode and how MIMO mode switching is performed when an environmental variable changes.

Figure 2:
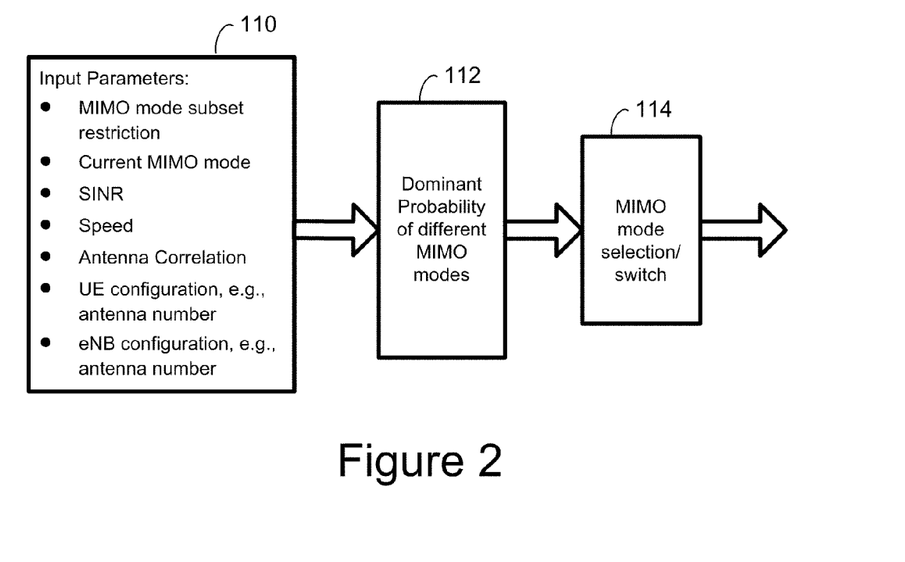
FIG. 2 illustrates an embodiment MIMO mode selection/switch architecture.

FIG. 2 illustrates an embodiment MIMO mode selection system. Input parameters 110 include MIMO mode subset restriction, current MIMO mode, SNR, Speed, Antenna Correlation, UE configuration, eNB configuration, and other parameters are provided as input to block 112 that determines a dominant probability of different MIMO modes. After the dominant probabilities are calculated, the results of the probability calculation are used to determine a MIMO mode by MIMO mode selection switch 114. In some embodiments of the present invention, these mode selection algorithms are performed by a computer and/or specialized processing hardware and/or software within the wireless communication system, for example in a base station or within a subscriber handset. In alternative embodiments of the present invention, mode selection can be performed by other hardware and/or software associated with the system.

Figure 3:
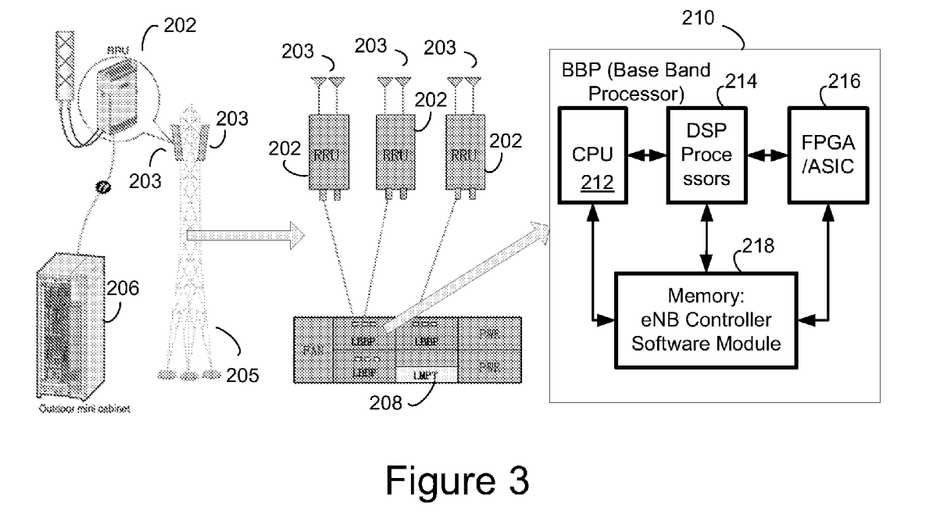
FIG. 3 illustrates an embodiment system that supports a base station encompassing the control functionality for MIMO mode selection and switching.

FIG. 3 illustrates an embodiment base station system having a plurality of remote radio units (RRU) 202, each having a plurality of antennas 203. In some embodiments, remote radio units 202 are implemented in outdoor cabinet 206 and antennas 203 are mounted on tower 205. In alternative embodiments, RRU 202 can be implemented indoors, for example, in an equipment room. In further alternative embodiments, antennas 203 can be mounted other places, for example, on a building or indoors. In an embodiment, RRUs 202 are coupled to base station electronics 208. Base station electronics 208 has base station processor 210 that implements embodiment algorithms, as well as controls operation of the base station system. In an embodiment, the base station system is an eNB in an LTE system, however, in alternative embodiments, other systems types can be used.

In an embodiment, base station processor 210 has CPU 212, one or more DSP processor 214, one or more FPGAs or ASICs 216 and memory 218. In an embodiment, embodiment algorithms are implemented as a MIMO mode selection and switch algorithm software module resident in memory 218 and executed by CPU 212, DSP processors 214, and/or FPGAs and ASICs 216. In alternative embodiments, the base band system can have different components and different architectures besides the example shown in FIG. 3. In alternative embodiments, embodiment MIMO selection algorithms can be implemented using dedicated hardware or an ASIC, FPGA, microprocessor, or other electronic device. In further embodiments, embodiment MIMO selection algorithms can be implemented remotely from the base station, for example, in a central switching office or other remote device.

Figure 4:
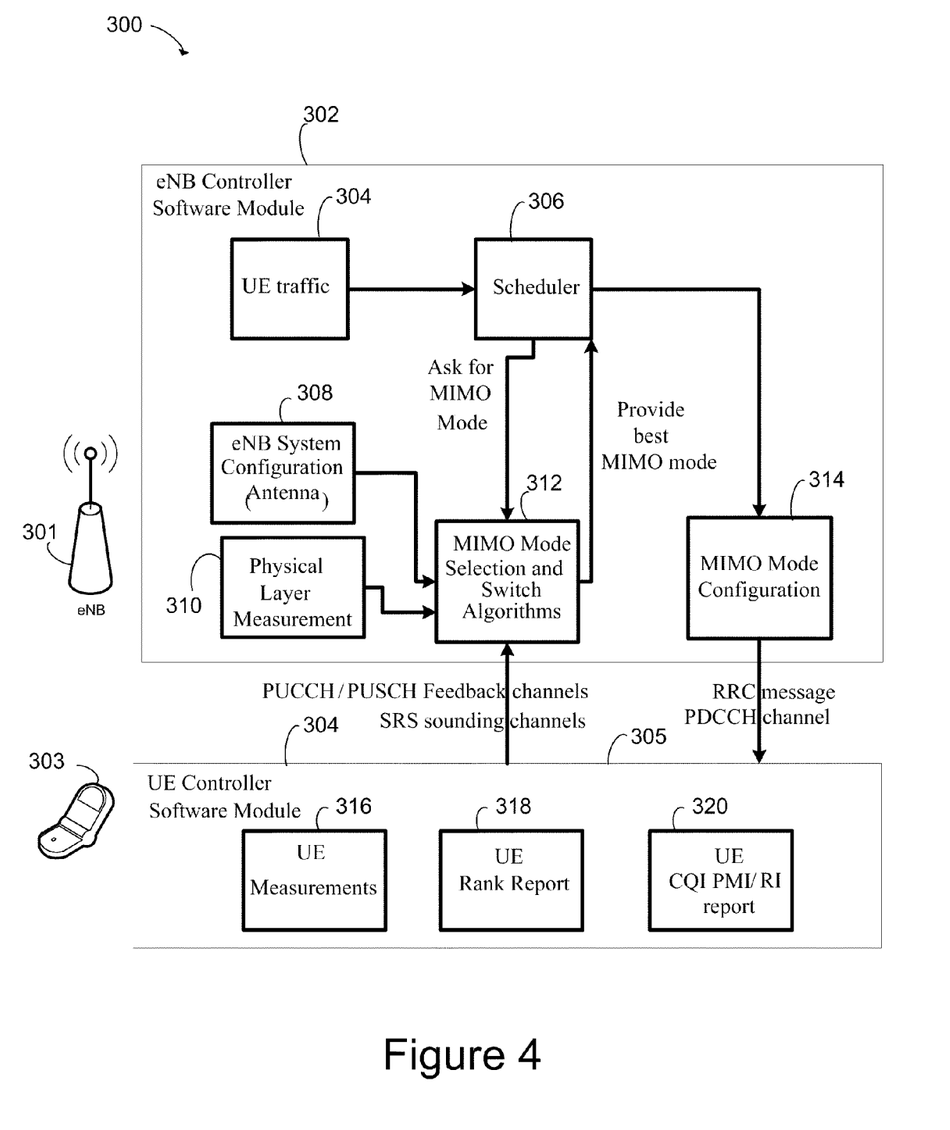
FIG. 4 illustrates an embodiment implementation of MIMO mode selection and switch algorithm in the eNB controller software module.

FIG. 4 illustrates a functional block diagram illustrating the operation and interaction between embodiment eNB controller software module 302 resident in base station 301 and a UE controller software module 305 resident in UE 303. Base station eNB controller software module 302 has UE traffic block 304, scheduler 306, eNB system configuration block 308, physical layer measurement block 310, MIMO mode selection and switch algorithm block 312, and MIMO mode configuration block 314. UE traffic block 304 provides, for example, information regarding the number and type of data flows associated with this UE, the priority of these data flows, the amount of data to be transmitted or received for each of these data flows, and the delay or estimated delay for each flow, etc. UE traffic block 304 continually updates this information, and provides its input to scheduler 306, which allocates resources and schedules user devices in the system. In alternative embodiments, other information can be provided by UE traffic block 304. Scheduler 306 requests a MIMO mode from MIMO mode selection and switch algorithm block 312, which, in turn, determines and provides a best available MIMO mode for this UE to scheduler 306. The scheduler then notifies MIMO mode configuration block 314 of the selected MIMO mode, which is communicated to UE 303 via a Radio Resource Control (RRC) messaging.

When determining the MIMO mode, MIMO mode selection and switch algorithm block 312 takes input from eNB system configuration block 308, which provides data regarding the physical configuration and parameters of the system, such as the number and configuration of base station antennas, the number of transmit and receive antennas for each UE, etc. MIMO mode selection and switch algorithm block 312 also takes input from physical layer measurement block 310, which provides information, for example, about the attributes of the physical channel between the base station and each of its served UEs, such as the estimated rank of the channel, the path loss between base station and UE, the variation of the channel in both the time and frequency domain. In alternative embodiments, other attributes can be provided.

In embodiments directed toward LTE systems, MIMO mode selection and switch algorithm block 312 further receives input from UE 303 via Physical Uplink Control Channel (PUCCH) feedback channels and Sounding Reference Signal (SRS) sounding channels. In alternative embodiments, for example, in embodiments directed toward non-LTE systems, input can be received via other channels. Input received from UE software module 305 includes UE measurements 316, UE channel rank estimation 318, and Channel Quality Indicator/Precoding Matrix Indicator/Rank Indicator (UE CQI/PMI/RI) reporting module 320. System 300 is one example of an embodiment system. In alternative embodiments, eNB controller 302 and/or UE controller 304 can be implemented differently using greater and/or fewer blocks and modules depending on the system, application, and its specifications.

In an embodiment, a probability of each MIMO mode being selected as a best MIMO mode is modeled using a Fuzzy logic approach. This probability can be viewed as being the probability of the MIMO mode being selected as the best mode by the UE. Since the UE can measure the downlink (DL), it can assess the best MIMO mode for the DL. However, a base station or base transceiver station (BTS) can only measure the uplink (UL), and combine this information with additional DL measurements reported by the UE. Hence, the base station estimates the probability that a particular MIMO mode would be selected by the UE as the best mode, given the information that is available to the base station. At the base station, for example, an eNB in a LTE system, the dominant probability of different MIMO modes is calculated using an embodiment probability model, based on parameters such as the measured signal-noise-ratio (SNR), speed of the UE, the antenna correlation, UE configuration and eNB configuration (e.g., the antenna number). The dominant probability is defined as the probability that this MIMO mode should be chosen as the best MIMO mode under the input parameters. In alternative embodiments, other parameters can be used.

In an embodiment, if the transmit antenna number at eNB is equal to "1", meaning that there is a single antenna operating, the dominant probability of mode 1 (single antenna port, port 0) is 1, and the dominant probabilities of other modes are "0". In some embodiments, a single antenna may be operating if the configuration of the base station does not support MIMO, if the base station is only configured to transmit from a single antenna, or in the event of an abnormal operating condition, such as a failure of one of the base station transmit chains, for example. If, however, the transmit antenna number at eNB is larger than "1", a mathematical function is used to model the dominant probability of different MIMO modes. Possible mathematical functions include, but are not limited to exponential functions, complimentary functions and Gaussian functions, for example.

In the following, using Gaussian distribution as an example, a model is given for N×N systems. For N×M systems, there are n=min(N,M) ranks for closed-loop SM and the dominant probabilities for each rank are modeled as:

Rank=1

One-Side Gaussian:

$$P(SM, \text{Rank} = i, i = 1) = \begin{cases} \lambda a(\tau, \rho) \times \exp\left(-\frac{(\gamma - b(i))^2}{2c(i)^2}\right) + d & \gamma > b(i) \\ \lambda a(\tau, \rho) & \text{otherwise} \end{cases} \quad (1)$$

Rank=2, 3, . . . , n−1

Two-Side Gaussian:

$$P(SM, \text{Rank} = i, i = 2, 3, \ldots, n-1) = \lambda a(\tau, \rho) \times \exp\left(-\frac{(\gamma - b(i))^2}{2c(i)^2}\right) \quad (2)$$

Rank=n
One-Side Gaussian:

$$P(SM, \text{Rank} = i, i = n) = \begin{cases} \lambda a(\tau, \rho) \times \exp\left(-\frac{(\gamma - b(i))^2}{2c(i)^2}\right) & \gamma < b(i) \\ \lambda a(\tau, \rho) & \text{otherwise.} \end{cases} \quad (3)$$

where, n=min(N,M), N is a number of transmit antennas, M is a number of receive antennas, $\lambda$ is a normalization factor, $\gamma$ is an SNR in dB, SM denotes spatial multiplexing, a(i), b(i), c(i), and a($\tau,\rho$) are model parameters, d is a constant shift, $\rho$ is a correlation among transmit antennas, $\tau$ is a normalized feedback delay, $\tau = f_d T$, where T is a report interval, $f_d$ is a Doppler frequency shift, such that $$f_d = f_c \frac{v}{c},$$

where v is a user and/or vehicle speed, c is the speed of light, and $f_c$ is a carrier frequency.

A dominant probability of transmit/spatial diversity (SD) is modeled as two-side Gaussian:

$$P(SD) = \lambda a(\tau, \rho) \times \exp\left(-\frac{(\gamma - b(SD))^2}{2c(SD)^2}\right), \quad (4)$$

where b(SD), and c(SD) are model parameters.

In an embodiment using MIMO modes SD, CLSM, and OLCDD, given the dominant probabilities of SD, CLSM, the dominant probability of OLCDD is:

$$P(OLCDD) = 1 - \sum_{i=1}^{N} P(SM, \text{Rank} = i) - P(SD). \quad (5)$$

In an embodiment, $\lambda$ is a normalized factor, such that:

$$\max\left\{\sum_i P(SM, \text{Rank} = i) + P(SD)\right\} = 1. \quad (6)$$

In some embodiments, choosing a different $\lambda$ does not affect the relative relation between these four MIMO modes. In such embodiments, if a relative comparison approach is used, $\lambda$ is not recalculated, however, in alternative embodiments, $\lambda$ may be recalculated.

Figure 5:
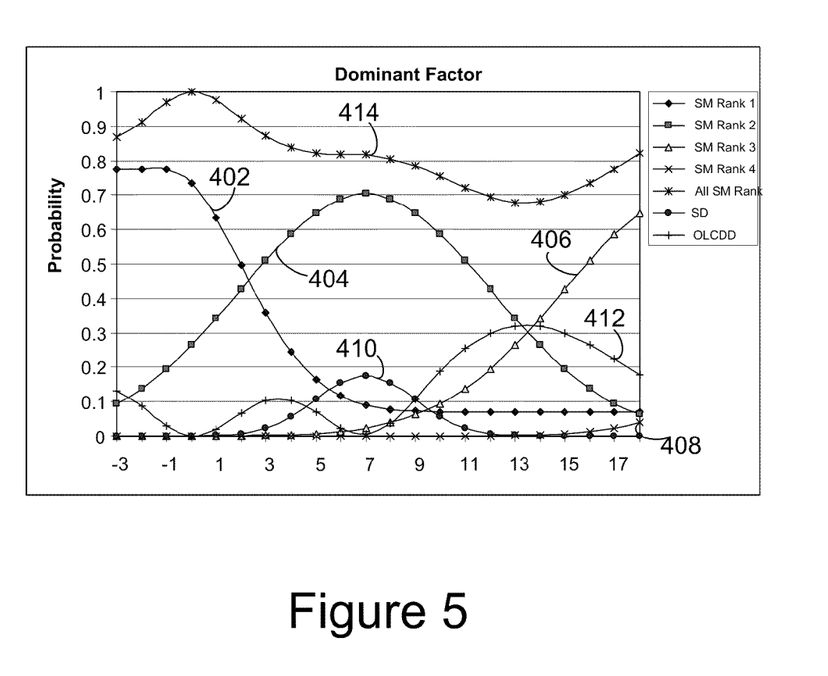
FIG. 5 illustrates a model for an embodiment 4×4 system with low speed and un-correlated antennas.
Figure 6:
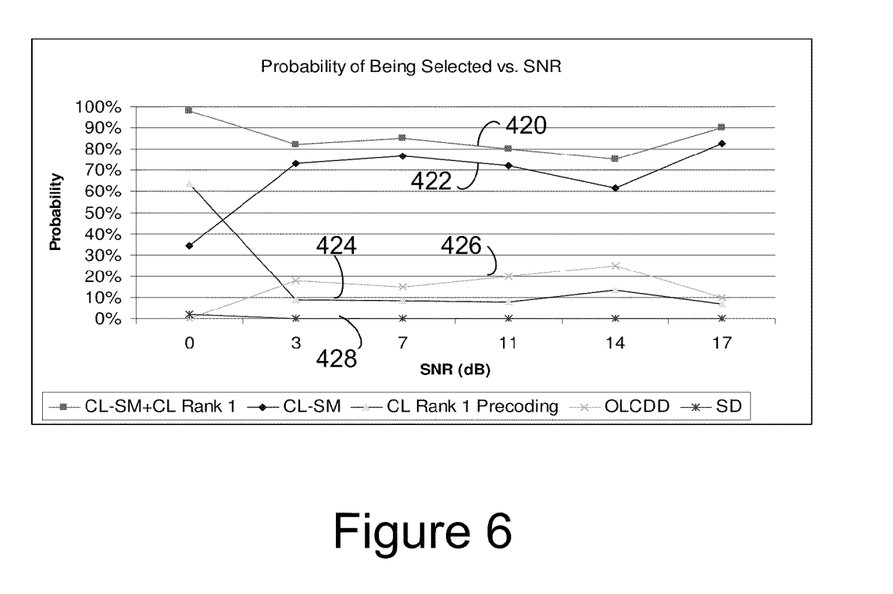
FIG. 6 illustrates simulation results for an embodiment 4×4 system with low speed and un-correlated antennas.

The verification of this model from the simulation results is illustrated in FIGS. 5 and 6. For example, FIG. 5 illustrates a model for an embodiment 4×4 system with low speed and un-correlated antennas. This means that there are 4 transmit antennas and 4 receive antennas, and that there is low correlation between the channels seen from different antennas (e.g. due to the separation between these antennas being large when compared to the wavelength of the RF signal). In alternative embodiments, different parameters can be used. Each trace on the graph represents a model of the probability of the corresponding MIMO mode being the dominant or best mode vs. the average DL Signal to Interference plus Noise Ratio (SINR) in dB. For example, traces 402, 404, 406 and 408 represent spatial multiplexing (SM) of ranks 1, 2, 3 and 4, respectively. Trace 414 represents the sum probability of all SM ranks together. Trace 410 represents spatial diversity (SD) and trace 412 represents OLCDD Each trace is modeled according to corresponding equations (1) though (6).

FIG. 6 illustrates a corresponding graph for the probability of best MIMO mode vs. SINR obtained from a system simulation. This graph is similarly of an embodiment 4×4 system with low speed and un-correlated transmit antennas. Trace 424 represents CL Rank 1 precoding, while trace 422 represents CL-SM for channel rank>1, and trace 420 combines CL-SM for all ranks Similarly, trace 426 represents OLCSS, and trace 428 represents SD. Note that with the possible exception of SD, the traces modeled in FIG. 5 closely approximate the results of the simulations depicted in FIG. 6. This validates that the model given by equations (1) though (6) above can be used to predict the probability of a particular MIMO mode being the best mode for a particular UE.

Figure 7:
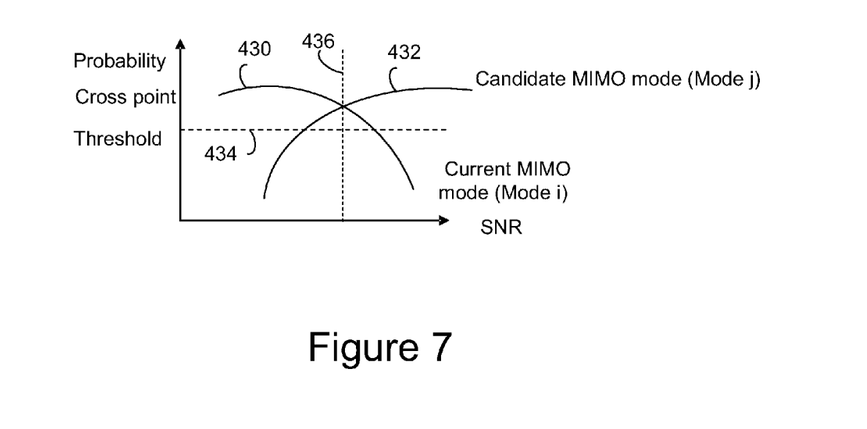
FIG. 7 illustrates a graph of the performance of an embodiment MIMO mode switch.

FIG. 7 illustrates conceptually how an embodiment MIMO mode switch uses this predictive model. Trace 430 represents a current MIMO mode (mode i), while trace 432 represents a candidate MIMO mode (mode j), trace 436 represents a crosspoint, and trace 434 represents a threshold. In this example, once the SINR exceeds the threshold defined by the cross point 436, the model would predict that it is more likely for MIMO mode j to be the best mode, rather than MIMO mode i. Hence, in an embodiment, this event may serve as a trigger for the MIMO mode selection and switching module 312 to select MIMO mode j in preference to MIMO mode i. In some embodiments, however, this may come at the price of additional signaling generated by the MIMO mode configuration module 314, and communicated from the base station to the UE, consuming air interface resources.

In some embodiments, MIMO mode selection and switching module 312 delays this decision to change the MIMO mode from i to j, until probability of mode j (trace 432) being better than mode i (trace 430), has exceeded some threshold 434. Similarly, if the SINR level is falling, then MIMO mode selection and switching module 312 might only select MIMO mode i in preference to MIMO mode j, once the probability of the former being the best mode, has exceeded that of the later, by a similar (or possibly different) threshold 434. This can be understood to be another possible embodiment of this invention. In such an embodiment, the possibility of ping-pong selection of competing MIMO modes for an SINR value close to the cross point 436, can be limited or eliminated.

In an embodiment MIMO mode selection and switching scheme, best MIMO mode is determined and configured. Given a trigger function, an absolute comparison or relative comparison approach is used to select the best MIMO. In the relative approach, $\lambda$ is not calculated in some embodiments.

In one embodiment, the following method is used to determine the MIMO mode:

Check if a complete list of input parameters is available,
1. If yes, check if the UE has already been configured to a specific MIMO mode
   a. If yes,
      i. Define the configured mode as mode c.
      ii. Find the subset S of MIMO modes that are candidates to be switched to from mode c. Start MIMO mode selection and switching procedure
      iii. For each MIMO mode i belonging to subset S, calculate the probability Pi(t), that mode i is the dominant mode for this UE at time t.
      iv. Find the MIMO mode in subset S with the highest probability. Define this as mode m, and the corresponding probability at time t to be Pm(t).

v. If 10 log 10(Pm(t)/Pc(t))>threshold1 for a timer interval t_switch, switch to mode m;
vi. If not, keep MIMO mode c as the configured mode.
vii. Return to step (1.a.i)
b. If no, then select an initial MIMO mode:
 i. Calculate the probability of the 4 MIMO modes (CL SM, CL Rank-1, OLCDD, SD) and sort them in descending order as P1>=P2>=P3>=P4,
 ii. Calculate the probability of CL mode as P(CL)=P(CL SM)+P(CL Rank-1), and the probability of OL mode as P(OL)=P(OLCDD)+P(SD).
 iii. If 10 log 10(P1/P2)>threshold2,
  1. Then mode 1 is the dominant MIMO mode at this time. Select mode1 as the best MIMO mode.
  2. Otherwise, there is no dominant MIMO mode at this time. Then if P(CL)<P(OL), configure OLCDD as the MIMO mode for this UE. Otherwise, configure CL-SM as the MIMO mode for this UE.
 iv. Return to step (1.a.a.i)
2. If no, configure the UE's MIMO mode as a default MIMO mode.
 a. If numbers of transmit antennas at base station is equal to 1, the default MIMO mode is Mode 1 (single-antenna, port 0)
 b. Else the number of transmit antennas at the base station is larger than 1, then the default MIMO mode is Mode 3 (OLCDD).

In an embodiment of the present invention, a method selects a best MIMO mode for a wireless MIMO system from several available MIMO mode options. In a further embodiment a probability model is used to calculate a dominant mode with a highest probability from the different MIMO modes. In some embodiments, the dominant probability is modeled as a mathematical function. Possible mathematical functions include, but are not limited to an exponential function, complimentary function and Gaussian function, for example. In some embodiments, a Fuzzy logic approach is used to model the probability model.

In an embodiment, a method for determining a MIMO mode for a wireless communication system includes providing input parameters, determining a probability of each MIMO mode, and selecting the dominant MIMO mode based on this determining.

In an embodiment, a probability based method of enabling the selection of a best MIMO mode and switch to the best MIMO modes in wireless systems is disclosed. The method models the probabilities of choosing different MIMO mode as the best MIMO mode and decides the best MIMO mode or switches to the best MIMO mode based on the calculated probabilities. A probability model is formulated based on a Fuzzy logic approach. In one example, a Gaussian distribution is used to model the probability. In addition, a threshold is introduced to avoid the ping-pong effects of MIMO mode switching.

In an embodiment, a model of dominant probability for MIMO modes calculates the probability of different MIMO modes being selected as the best MIMO modes using a Fuzzy logic approach. The model can be a statistical model based on empirical results, or might be the result of extensive simulations of the wireless environment. An aspect of the model is that it overcomes the difficulty of selecting the best MIMO mode for a fast changing environment.

In an embodiment, a system and method of selecting/switching to the best MIMO mode are disclosed. The embodiment uses a threshold and a timer to avoid ping-pong effects of MIMO mode switching.

Some embodiment methods include a procedure of selecting or switching to the best MIMO mode given the calculated dominant probabilities.

Some embodiments use a relative approach to compare the dominant probability. To avoid the ping-pong effects, a threshold and a timer can be further introduced in a relative comparison approach.

In an embodiment, a method of determining a MIMO mode for a wireless communication system, includes providing input parameters, an electronic device determining a probability of each MIMO mode being a dominant MIMO mode, and selecting the MIMO mode based on the determining. In some embodiments, the different MIMO modes include a transmit diversity mode, an open-loop spatial multiplexing mode, and a closed-loop spatial multiplexing mode.

In an embodiment, a dominant probability of the closed-loop spatial multiplexing mode is determined according to a formula parametrized by a rank of the MIMO channel, where, for rank=1, the dominant probability is modeled as a one-sided Gaussian distribution:

$$P(SM, \text{Rank} = i, i = 1) = \begin{cases} \lambda a(\tau, \rho) \times \exp\left(-\frac{(\gamma - b(i))^2}{2c(i)^2}\right) + d & \gamma > b(i) \\ \lambda a(\tau, \rho) & \text{otherwise,} \end{cases}$$

for rank=2, 3, ..., n−1, the dominant probability is modeled as a two-sided Gaussian distribution:

$$P(SM, \text{Rank} = i, i = 2, 3, \ldots, n-1) = \lambda a(\tau, \rho) \times \exp\left(-\frac{(\gamma - b(i))^2}{2c(i)^2}\right),$$

and for rank=n, the dominant probability is modeled as a one-sided Gaussian distribution:

$$P(SM, \text{Rank} = i, i = n) = \begin{cases} \lambda a(\tau, \rho) \times \exp\left(-\frac{(\gamma - b(i))^2}{2c(i)^2}\right) & \gamma < b(i) \\ \lambda a(\tau, \rho) & \text{otherwise,} \end{cases}$$

where, n=min(N,M), N is a number of transmit antennas, M is a number of receive antennas, $\lambda$ is a normalized factor, $\gamma$ is an SNR in dB, SM denotes spatial multiplexing, a(i), b(i), c(i) and a($\tau$,$\rho$) are model parameters, d is a constant shift, $\rho$ is a correlation between transmit antennas, $\tau$ is a normalized feedback delay, $\tau=f_d T$, where T is a report interval, $f_d$ is a Doppler frequency shift, such that $$f_d = f_c \frac{v}{c},$$

where v is a user speed, c is the speed of light. $f_c$ is a carrier frequency.

In an embodiment, the dominant probability of the transmit diversity mode is:

$$P(SD) = \lambda a(\tau, \rho) \times \exp\left(-\frac{(\gamma - b(SD))^2}{2c(SD)^2}\right);$$

where b(SD), and c(SD) are model parameters. In a further embodiment, the dominant probability P(OLCDD) of the open loop spatial multiplexing mode is:

$$P(OLCDD) = 1 - \sum_{i=1}^{N} P(SM, \text{Rank} = i) - P(SD).$$

In some embodiments, $\lambda$ is normalized such that $$\max\left\{\sum_i P(SM, \text{Rank} = i) + P(SD)\right\} = 1$$

In an embodiment the input parameters include at least one of MIMO mode subset restriction, current MIMO mode, signal to nose ratio (SNR), speed, antenna correlation, user equipment (UE) configuration and base station configuration. In one embodiment, determining the dominant probabilities of different MIMO modes includes using a fuzzy logic approach to model dominant probabilities. In another embodiment, determining the dominant probabilities of different MIMO modes includes using a complementary function or an exponential function. In an embodiment, selecting the MIMO mode includes selecting a MIMO mode having the highest probability of being the dominant MIMO mode.

In an embodiment, the electronic device includes a baseband processor and/or other processing device such as a microprocessor or microcontroller. In a further embodiment, the electronic device compares the dominant probabilities using a threshold and a timer to avoid ping-pong effects.

In an embodiment, a method of determining a MIMO mode for a wireless communication system includes sorting the possible MIMO modes according to their respective probabilities, an electronic device determining a relative ratio between a highest probability mode and a second highest probability mode based on the sorting, if the relative ratio is greater than a threshold, determining the highest probability mode as the best mode. In some embodiments, if the relative ratio is not greater than the threshold, a probability of an open loop MIMO mode is compared with a probability of a closed loop MIMO mode. If a probability of the open loop MIMO mode is greater than a probability of the closed loop MIMO mode, the wireless communication system is configured to operate in the open loop MIMO mode. In some embodiments, if the probability of the open loop MIMO mode is not less than the probability of the closed loop MIMO mode, the wireless communication system is configured to operate in the closed loop MIMO mode.

In some embodiment, the method includes determining the probability of available MIMO modes, comprising determining a probability of each MIMO mode being a dominant MIMO mode; and selecting the MIMO based on the determined best mode.

In an embodiment, a method of determining a MIMO mode for a wireless communication system includes operating a user device in a first MIMO mode, an electronic device calculating a probability of a first MIMO mode being the dominant mode for user device. The electronic device calculates a probability of a second MIMO mode being the dominant mode for user device and determines a relative ratio between the probability of the second MIMO mode to the probability of the first MIMO mode. If the relative ratio is greater than a threshold for greater than a first period of time, the user device is operated in the second MIMO mode.

In an embodiment, the method further includes calculating a probability of the user device in one or more additional MIMO modes, determining relative ratios between the probability of a currently configured MIMO mode being the dominant mode for the user device, and the probability of one or more additional MIMO modes being the dominant mode for the user device. If one of the relative ratios is greater than the threshold for greater than a second period of time, the user device is operated in a MIMO mode having the greatest probability.

In an embodiment, a system for determining a MIMO mode for a wireless communication system includes dominant probability calculation block configured to calculate dominant probabilities for a user device under a plurality of MIMO modes, and a MIMO mode selection block coupled to the dominant probability calculation block. The MIMO mode selection block is configured to determine a highest of the dominant probabilities, by selecting a MIMO mode corresponding to the highest probability if a ratio between the highest probability and the next highest probability is greater than a threshold. In an embodiment, the dominant probability calculation block and the MIMO mode selection block are implemented on a base station processor.

Although the embodiments and their advantages have been described in detail, it should be understood that various changes, substitutions and alterations can be made herein without departing from the spirit and scope of the invention. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

What is claimed is:

1. A method of determining a multiple-input multiple-output (MIMO) mode for a wireless communication system, the method comprising:
    analyzing, by a base station, input parameters affecting relative MIMO mode performance;
    determining, by the base station, a probability of each MIMO mode being a dominant MIMO mode, wherein MIMO modes comprise a transmit diversity mode, an open-loop spatial multiplexing mode, and a closed-loop spatial multiplexing mode, and wherein a dominant probability of the closed-loop spatial multiplexing mode is determined according to a formula parameterized by a rank of a MIMO channel, wherein:
    for rank=1, the dominant probability is modeled as a one-sided Gaussian distribution:

$$P(SM, \text{Rank} = i, i = 1) = \begin{cases} \lambda a(\tau, \rho) \times \exp\left(-\frac{(\gamma - b(i))^2}{2c(i)^2}\right) + d & \gamma > b(i) \\ \lambda a(\tau, \rho) & \text{otherwise}; \end{cases}$$

for rank=2, 3, ..., n-1, the dominant probability is modeled as a two-sided Gaussian distribution:

$$P(SM, \text{Rank} = i, i = 2, 3, \ldots, n-1) = \lambda a(\tau, \rho) \times \exp\left(-\frac{(\gamma - b(i))^2}{2c(i)^2}\right);$$

and for rank=n, the dominant probability is modeled as a one-sided Gaussian distribution:

$$P(SM, \text{Rank} = i, i = n) = \begin{cases} \lambda a(\tau, \rho) \times \exp\left(-\frac{(\gamma - b(i))^2}{2c(i)^2}\right) & \gamma < b(i) \\ \lambda a(\tau, \rho) & \text{otherwise,} \end{cases}$$

wherein, n=min(N,M), N is a number of transmit antennas, M is a number of receive antennas, $\lambda$ is a normalized factor, $\gamma$ is an SNR in dB, SM denotes spatial multiplexing, a(i), b(i), c(i) and a($\tau,\rho$) are model parameters, d is a constant shift, $\rho$ is a correlation between transmit antennas, $\tau$ is a normalized feedback delay, $\tau=f_dT$, where T is a report interval, $f_d$ is a Doppler frequency shift, such that $$f_d = f_c \frac{v}{c},$$

where v is a user speed, c is the speed of light, $f_c$ is a carrier frequency;

comparing, by the base station, the probability of each MIMO mode to determine a highest probability; and selecting, by the base station, the MIMO mode having the highest probability of being the dominant MIMO mode.

2. The method of claim 1 wherein a dominant probability of the transmit diversity mode is:

$$P(SD) = \lambda a(\tau, \rho) \times \exp\left(-\frac{(\gamma - b(SD))^2}{2c(SD)^2}\right);$$

wherein $\lambda$ is a normalized factor, $\gamma$ is an SNR in dB, a($\tau,\rho$), b(SD), and c(SD) are model parameters, $\rho$ is correlation between transmit antennas, $\tau$ is a normalized feedback delay, $\tau=f_dT$, where T is a report interval, $f_d$ is a Doppler frequency shift, such that $$f_d = f_c \frac{v}{c},$$

where v is a user speed, c is the speed of light, $f_c$ is a carrier frequency.

3. The method of claim 1, wherein a dominant probability P(OLCDD) of the open loop spatial multiplexing mode is:

$$P(OLCDD) = 1 - \sum_{i=1}^{N} P(SM, \text{Rank} = i) - P(SD);$$

wherein $$P(SD) = \lambda a(\tau, \rho) \times \exp\left(-\frac{(\gamma - b(SD))^2}{2c(SD)^2}\right);$$

-continued $$P(SM, \text{Rank} = i, i = 1) =$$
$$\begin{cases} \lambda a(\tau, \rho) \times \exp\left(-\frac{(\gamma - b(i))^2}{2c(i)^2}\right) + d & \gamma > b(i) \\ \lambda a(\tau, \rho) & \text{otherwise,} \end{cases}$$

$$P(SM, \text{Rank} = i, i = 2, 3, \ldots, n-1) = \lambda a(\tau, \rho) \times \exp\left(-\frac{(\gamma - b(i))^2}{2c(i)^2}\right);$$

$$P(SM, \text{Rank} = i, i = n) = \begin{cases} \lambda a(\tau, \rho) \times \exp\left(-\frac{(\gamma - b(i))^2}{2c(i)^2}\right) & \gamma < b(i) \\ \lambda a(\tau, \rho) & \text{otherwise;} \end{cases}$$

wherein, n=min(N,M), N is a number of transmit antennas, M is a number of receive antennas, $\lambda$ is a normalized factor, $\gamma$ is an SNR in dB, SM denotes spatial multiplexing, d is a constant shift, a(i), b(i), c(i), a($\tau,\rho$), b(SD), and c(SD) are model parameters, $\rho$ is a correlation between transmit antennas, $\tau$ is a normalized feedback delay, $\tau=f_dT$, where T is a report interval, $f_d$ is a Doppler frequency shift, such that $$f_d = f_c \frac{v}{c},$$

where v is a user speed, c is the speed of light, and $f_c$ is a carrier frequency.

4. The method of claim 3, wherein $\lambda$ is normalized such that $$\max\left\{\sum_i P(SM, \text{Rank} = i, i = 1) + P(SD)\right\} = 1.$$

5. The method of claim 1, wherein the input parameters comprise at least one of MIMO mode subset restriction, current MIMO mode, signal to noise ratio (SNR), speed, antenna correlation, user equipment (UE) configuration and base station configuration.

6. The method of claim 1, wherein determining the probability of each MIMO mode being a dominant MIMO mode comprises using a fuzzy logic approach to model dominant probabilities.

7. The method of claim 1, wherein determining the probability of each MIMO mode being a dominant MIMO mode comprises using a complementary function or an exponential function.

8. The method of claim 1, wherein the selecting is performed by a baseband processor in the base station.

9. The method of claim 1, wherein the comparing further comprises using a threshold and a timer to avoid ping-pong effects.

10. A base station comprising:
a processor; and
a non-transitory computer readable storage medium storing programming for execution by the processor, the programming including instructions to:
analyze input parameters affecting relative MIMO mode performance;
determine a probability of each MIMO mode being a dominant MIMO mode, wherein MIMO modes comprise a transmit diversity mode, an open-loop spatial multiplexing mode, and a closed-loop spatial multiplexing mode, and wherein the programming further comprises instructions to determine a dominant probability of the transmit diversity mode according to:

$$P(SD) = \lambda a(\tau, \rho) \times \exp\left(-\frac{(\gamma - b(SD))^2}{2c(SD)^2}\right);$$

wherein λ is a normalized factor, γ is an SNR in dB, $a(\tau,\rho)$, b(SD), and c(SD) are model parameters, ρ is correlation between transmit antennas, τ is a normalized feedback delay, $\tau = f_d T$, where T is a report interval, $f_d$ is a Doppler frequency shift, such that $$f_d = f_c \frac{v}{c},$$

where v is a user speed, c is the speed of light, $f_c$ is a carrier frequency;
  compare the probability of each MIMO mode to determine a highest probability; and
  select the MIMO mode having the highest probability of being the dominant MIMO mode.

11. The base station of claim 10, wherein the programming further comprises instructions for determining a dominant probability of the closed-loop spatial multiplexing mode according to a formula parameterized by a rank of a MIMO channel, wherein:
  for rank=1, the dominant probability is modeled as a one-sided Gaussian distribution:

$$P(SM, \text{Rank} = i, i = 1) = \begin{cases} \lambda a(\tau, \rho) \times \exp\left(-\frac{(\gamma - b(i))^2}{2c(i)^2}\right) + d & \gamma > b(i) \\ \lambda a(\tau, \rho) & \text{otherwise;} \end{cases}$$

for rank=2, 3, ..., n−1, the dominant probability is modeled as a two-sided Gaussian distribution:

$$P(SM, \text{Rank} = i, i = 2, 3, \ldots, n-1) = \lambda a(\tau, \rho) \times \exp\left(-\frac{(\gamma - b(i))^2}{2c(i)^2}\right); \text{and}$$

for rank=n, the dominant probability is modeled as a one-sided Gaussian distribution:

$$P(SM, \text{Rank} = i, i = n) = \begin{cases} \lambda a(\tau, \rho) \times \exp\left(-\frac{(\gamma - b(i))^2}{2c(i)^2}\right) & \gamma < b(i) \\ \lambda a(\tau, \rho) & \text{otherwise,} \end{cases}$$

wherein, n=min(N,M), N is a number of transmit antennas, M is a number of receive antennas, λ is a normalized factor, γ is an SNR in dB, SM denotes spatial multiplexing, a(i), b(i), c(i) and $a(\tau,\rho)$ are model parameters, d is a constant shift, ρ is a correlation between transmit antennas, τ is a normalized feedback delay, $\tau = f_d T$, where T is a report interval, $f_d$ is a Doppler frequency shift, such that $f_d = f_c v/c$, where v is a user speed, c is the speed of light, $f_c$ is a carrier frequency.

12. The base station of claim 10, wherein the programming further comprises instructions for determining a dominant probability P(OLCDD) of the open loop spatial multiplexing mode according to:

$$P(OLCDD) = 1 - \sum_{i=1}^{N} P(SM, \text{Rank} = i) - P(SD);$$

wherein $$P(SD) = \lambda a(\tau, \rho) \times \exp\left(-\frac{(\gamma - b(SD))^2}{2c(SD)^2}\right);$$

$$P(SM, \text{Rank} = i, i = 1) =$$
$$\begin{cases} \lambda a(\tau, \rho) \times \exp\left(-\frac{(\gamma - b(i))^2}{2c(i)^2}\right) + d & \gamma > b(i) \\ \lambda a(\tau, \rho) & \text{otherwise,} \end{cases}$$

$$P(SM, \text{Rank} = i, i = 2, 3, \ldots, n-1) = \lambda a(\tau, \rho) \times \exp\left(-\frac{(\gamma - b(i))^2}{2c(i)^2}\right);$$

$$P(SM, \text{Rank} = i, i = n) = \begin{cases} \lambda a(\tau, \rho) \times \exp\left(-\frac{(\gamma - b(i))^2}{2c(i)^2}\right) & \gamma < b(i) \\ \lambda a(\tau, \rho) & \text{otherwise;} \end{cases}$$

wherein, n=min(N,M), N is a number of transmit antennas, M is a number of receive antennas, λ is a normalized factor, γ is an SNR in dB, SM denotes spatial multiplexing, d is a constant shift, a(i), b(i), c(i), $a(\tau,\rho)$, b(SD), and c(SD) are model parameters, ρ is a correlation between transmit antennas, τ is a normalized feedback delay, $\tau = f_d T$, where T is a report interval, $f_d$ is a Doppler frequency shift, such that $f_d = f_c v/c$, where v is a user speed, c is the speed of light, and $f_c$ is a carrier frequency.

13. The base station of claim 12, wherein λ is normalized such that $$\max\left\{\sum_i P(SM, \text{Rank} = i, i = 1) + P(SD)\right\} = 1.$$

14. The base station of claim 10, wherein the input parameters comprise at least one of MIMO mode subset restriction, current MIMO mode, signal to noise ratio (SNR), speed, antenna correlation, user equipment (UE) configuration and base station configuration.

15. The base station of claim 10, wherein the instructions for determining the probability of each MIMO mode being a dominant MIMO mode comprise instructions using a fuzzy logic approach to model dominant probabilities.

16. The base station of claim 10, wherein the instructions for determining the probability of each MIMO mode being a dominant MIMO mode comprise instructions using a complementary function or an exponential function.

17. The base station of claim 10, wherein the instructions for comparing further comprise instructions using a threshold and a timer to avoid ping-pong effects.

18. A method of determining a multiple-input multiple-output (MIMO) mode for a wireless communication system, the method comprising:
  analyzing, by a base station, input parameters affecting relative MIMO mode performance;
  determining, by the base station, a probability of each MIMO mode being a dominant MIMO mode, wherein MIMO modes comprise a transmit diversity mode, an open-loop spatial multiplexing mode, and a closed-loop spatial multiplexing mode, and wherein a dominant probability P(OLCDD) of the open loop spatial multiplexing mode is:

$$P(OLCDD) = 1 - \sum_{i=1}^{N} P(SM, \text{Rank} = i) - P(SD);$$

wherein $$P(SD) = \lambda a(\tau, \rho) \times \exp\left(-\frac{(\gamma - b(SD))^2}{2c(SD)^2}\right);$$

$P(SM, \text{Rank} = i, i = 1) =$ $$\begin{cases} \lambda a(\tau, \rho) \times \exp\left(-\frac{(\gamma - b(i))^2}{2c(i)^2}\right) + d & \gamma > b(i) \\ \lambda a(\tau, \rho) & \text{otherwise,} \end{cases}$$

$$P(SM, \text{Rank} = i, i = 2, 3, \ldots, n-1) = \lambda a(\tau, \rho) \times \exp\left(-\frac{(\gamma - b(i))^2}{2c(i)^2}\right);$$

$$P(SM, \text{Rank} = i, i = n) = \begin{cases} \lambda a(\tau, \rho) \times \exp\left(-\frac{(\gamma - b(i))^2}{2c(i)^2}\right) & \gamma < b(i) \\ \lambda a(\tau, \rho) & \text{otherwise;} \end{cases}$$

wherein, n=min(N,M), N is a number of transmit antennas, M is a number of receive antennas, λ is a normalized factor, γ is an SNR in dB, SM denotes spatial multiplexing, d is a constant shift, a(i), b(i), c(i), a(τ, ρ), b(SD), and c(SD) are model parameters, ρ is a correlation between transmit antennas, τ is a normalized feedback delay, τ=$f_d$T, where T is a report interval, $f_d$ is a Doppler frequency shift, such that $$f_d = f_c \frac{v}{c},$$

where v is a user speed, c is the speed of light, and $f_c$ is a carrier frequency;

comparing, by the base station, the probability of each MIMO mode to determine a highest probability; and selecting, by the base station, the MIMO mode having the highest probability of being the dominant MIMO mode.

19. The method of claim 18, wherein λ is normalized such that $$\max\left\{\sum_i P(SM, \text{Rank} = i, i = 1) + P(SD)\right\} = 1.$$

20. The method of claim 18, wherein the comparing further comprises using a threshold and a timer to avoid ping-pong effects.

* * * * *